(12) United States Patent
Gilboy

(10) Patent No.: US 8,745,678 B2
(45) Date of Patent: *Jun. 3, 2014

(54) METHOD AND APPARATUS FOR INTERNET PROTOCOL TELEVISION MEDIA CONTENT SHARING

(71) Applicant: AT&T Corp., New York, NY (US)

(72) Inventor: Christopher P. Gilboy, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/797,367

(22) Filed: Mar. 12, 2013

(65) Prior Publication Data

US 2013/0191871 A1   Jul. 25, 2013

Related U.S. Application Data

(63) Continuation of application No. 11/311,461, filed on Dec. 19, 2005, now Pat. No. 8,402,496.

(51) Int. Cl.
  *H04N 7/173* (2011.01)
(52) U.S. Cl.
  USPC .................................. 725/95; 725/93; 725/38
(58) Field of Classification Search
  USPC .............. 725/93, 95, 98, 51, 112, 153; 709/2, 709/231
  See application file for complete search history.

(56) References Cited

U.S. PATENT DOCUMENTS

| | | | | |
|---|---|---|---|---|
| 6,058,428 A | * | 5/2000 | Wang et al. | 709/232 |
| 6,133,910 A | * | 10/2000 | Stinebruner | 725/49 |
| 8,370,885 B1 | | 2/2013 | Gilboy | |
| 2002/0049852 A1 | * | 4/2002 | Lee et al. | 709/231 |
| 2002/0144289 A1 | * | 10/2002 | Taguchi et al. | 725/112 |
| 2003/0050062 A1 | | 3/2003 | Chen et al. | |
| 2003/0093804 A1 | * | 5/2003 | Chang et al. | 725/95 |
| 2003/0212804 A1 | * | 11/2003 | Hashemi | 709/228 |
| 2004/0225728 A1 | * | 11/2004 | Huggins et al. | 709/223 |
| 2006/0123455 A1 | | 6/2006 | Pai et al. | |
| 2007/0011714 A1 | | 1/2007 | Fellows | |

* cited by examiner

*Primary Examiner* — Pankaj Kumar
*Assistant Examiner* — Timothy Newlin

(57) ABSTRACT

A method and apparatus for enabling IP service subscribers to share media contents with other IP service subscribers or Internet users in either a secured or open fashion are disclosed. In one embodiment, the present invention enables the sharing of home movies, pictures, and other media contents, where media could be stored media or media created in realtime. Namely, the present method allows IP service subscribers to effectively create their own TV station, e.g., complete with stored or live content programming and content scheduling. In turn, the method allows a viewing subscriber to select and view a shared media program created by another subscriber.

20 Claims, 8 Drawing Sheets

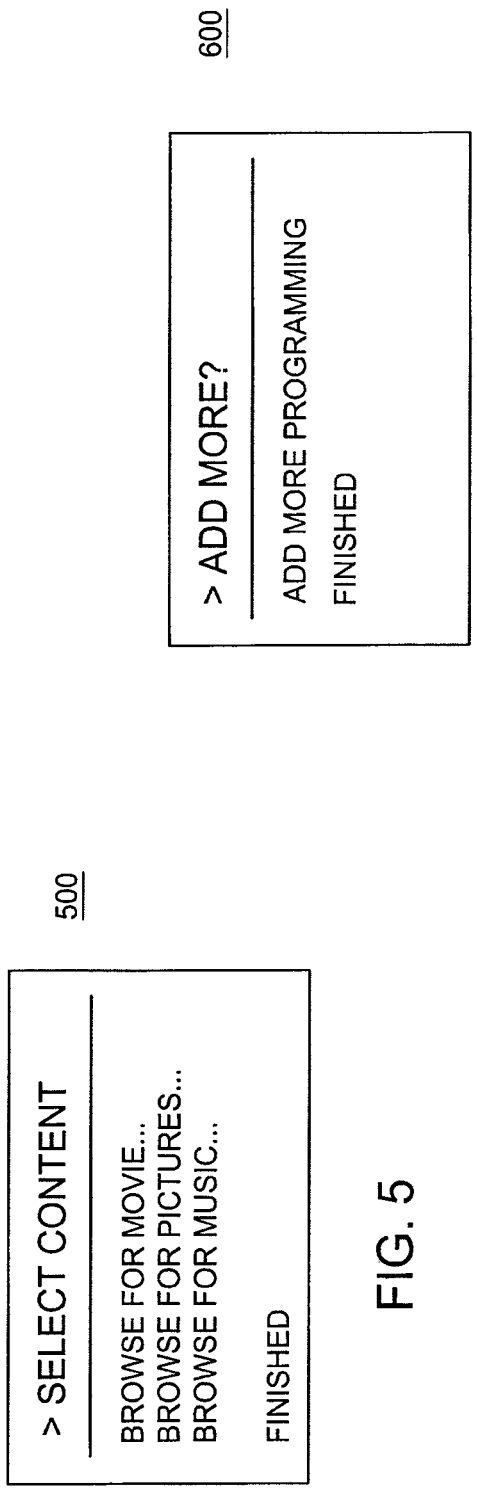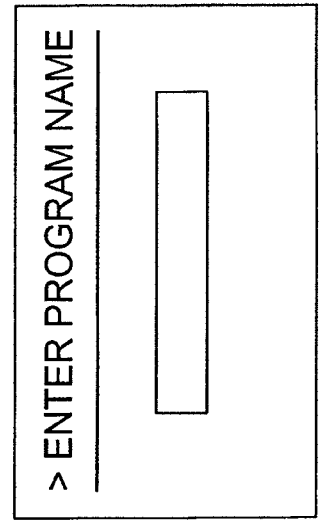
600
> ADD MORE?
───────────
ADD MORE PROGRAMMING
FINISHED
FIG. 6
500
> SELECT CONTENT
───────────
BROWSE FOR MOVIE...
BROWSE FOR PICTURES...
BROWSE FOR MUSIC...
FINISHED
FIG. 5
700
> ENTER PROGRAM NAME
───────────
FIG. 7

METHOD AND APPARATUS FOR INTERNET PROTOCOL TELEVISION MEDIA CONTENT SHARING

This application is a continuation of U.S. patent application Ser. No. 11/311,461, filed Dec. 19, 2005, now U.S. Pat. No. 8,402,496, and is herein incorporated by reference in its entirety.

The present invention relates generally to communication networks and, more particularly, to a method and apparatus for media content sharing in communication networks, e.g., packet networks such as Internet Protocol Television (IPTV) networks.

BACKGROUND OF THE INVENTION

In a traditional broadcast or cable television environment, content providers, such as a cable network operator or a broadcast television operator, send video contents, such as movie and television (TV) programming, to TV sets to be viewed by end users. Although end users have a large number of contents to choose from, they can only choose to view the contents provided by the content providers and cannot share their own contents to be viewed by other end users.

Therefore, a need exists for a method and apparatus for media content sharing in a packet network, e.g., an IPTV network.

SUMMARY OF THE INVENTION

In one embodiment, the present invention allows IP service subscribers, e.g., IPTV subscribers, to share media contents with other IP service subscribers or Internet users in either a secured or open fashion. For example, the present invention enables the sharing of home movies, pictures, and other media contents, where media could be stored media or media created in real-time. Thus, the present invention effectively allows IP service subscribers to create their own TV station, e.g., complete with stored or live content programming and content scheduling. The media content and programming can be shared by specifying an address that can be made public to targeted viewers. In turn, the method allows a viewing subscriber to select and view a shared media program created by another subscriber.

BRIEF DESCRIPTION OF THE DRAWINGS

The teaching of the present invention can be readily understood by considering the following detailed description in conjunction with the accompanying drawings, in which:

FIG. 5 illustrates an exemplary user interface screen for selecting shared media content related to the present invention;

FIG. 6 illustrates an exemplary user interface screen for adding shared media content related to the present invention;

FIG. 7 illustrates an exemplary user interface screen for entering a name for the shared media content programming related to the present invention;

To facilitate understanding, identical reference numerals have been used, where possible, to designate identical elements that are common to the figures.

DETAILED DESCRIPTION

In a traditional broadcast or cable television environment, content providers, such as a cable network operator or a broadcast television operator, send video contents, such as movie and television (TV) programming, to TV sets to be viewed by end users. Although end users have a large number of contents to choose from, they can only choose to view the contents provided by the content providers and cannot share their own contents to be viewed by other end users.

To address this need, the present invention allows IPTV subscribers to share media contents with other IPTV subscribers or Internet users in either a secured or open fashion. In one embodiment, the present invention enables the sharing of home movies, pictures, and other media contents, where media could be stored media or media created in real-time. Thus, the present invention effectively allows IPTV subscribers to create their own TV station, e.g., complete with stored or live content programming and content scheduling. The media content programming can be shared by specifying an address that can be made public to targeted viewers (e.g., with or without use an optional password). Therefore, the present invention provides a value-added service that an IPTV service provider can use to differentiate its IPTV products from cable, satellite, and other service providers.

Figure 1:
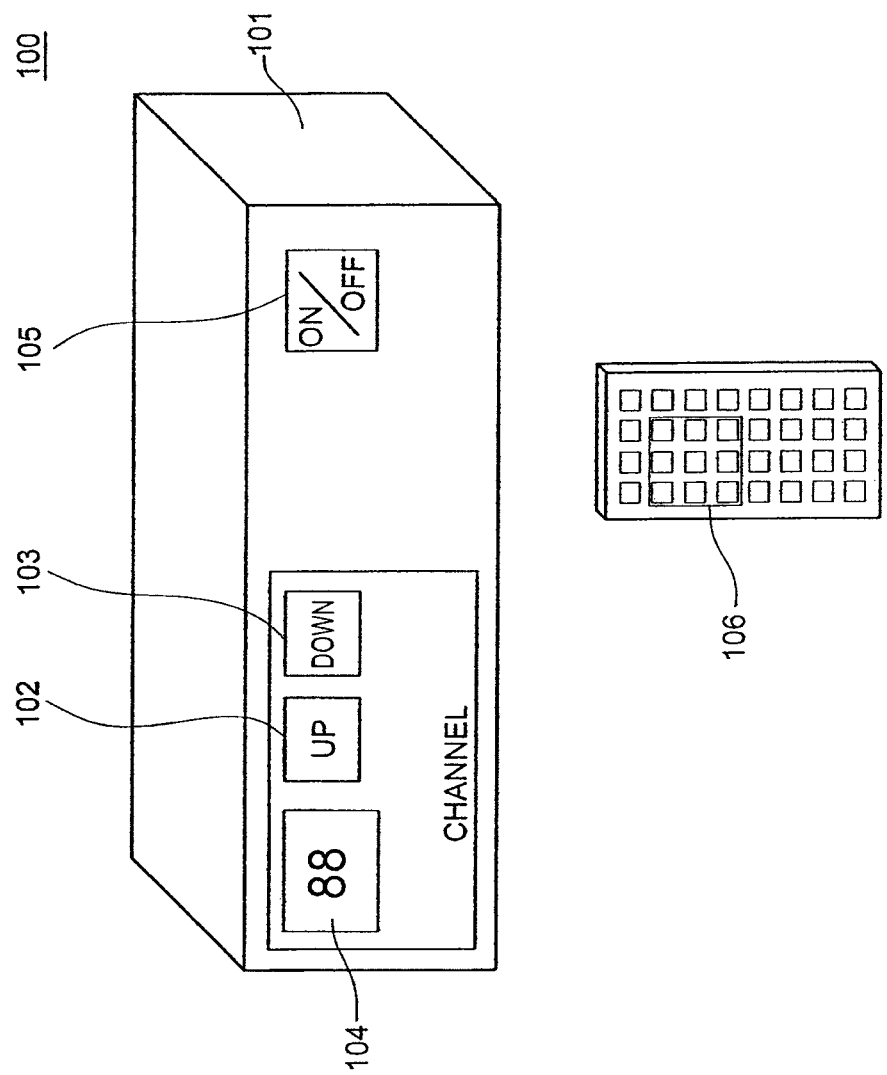
FIG. 1 illustrates exemplary components of Internet Protocol Television (IPTV) endpoint equipment related to the present invention.

To better understand the present invention, FIG. 1 illustrates exemplary components of Internet Protocol Television (IPTV) endpoint equipment 100 related to the present invention. In FIG. 1, in one embodiment, IPTV set top box 101 comprises control 102 and control 103 for changing channels, a channel display 104, and on and off control 105. Control 102 allows a user to change the current channel to the next available channel with a higher assigned channel number and control 103 allows a user to change the current channel to the next available channel with a lower assigned channel number. Channel display 104 shows the current channel number. On and off control 105 is used to turn set top box 101 on and off. In FIG. 1, remote control 106 provides the means for controlling set top box 101 remotely. The rear panel of set top box 101 comprises various terminals for input and output (I/O) devices such as media feed from the service provider, media feed to a TV and other I/O devices such as home network component, Video Cassette Recorder (VCR), Digital Versatile Disc (DVD), Digital Video Recorder (DVR), camera, and camcorder.

Figure 2:
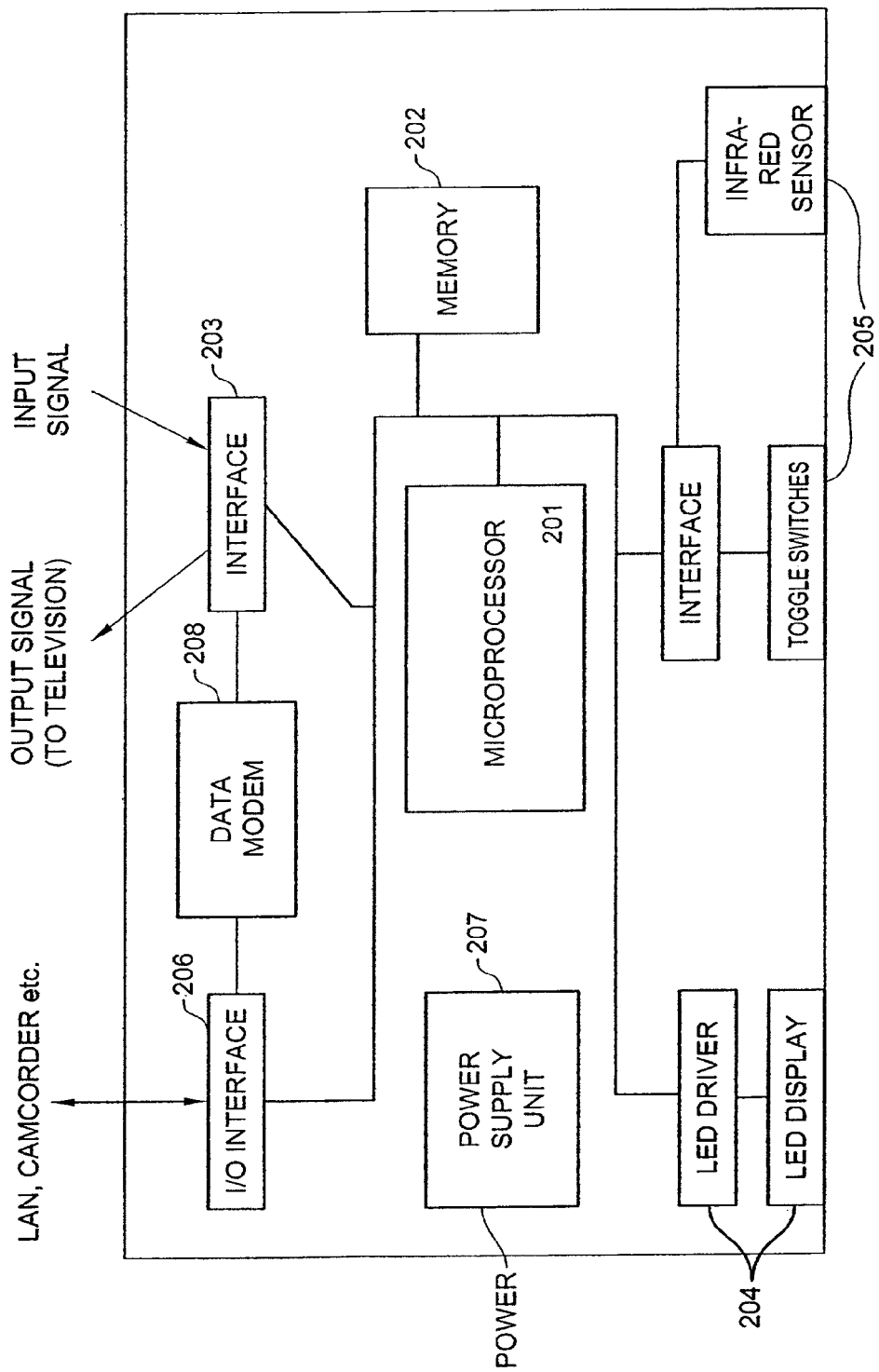
FIG. 2 illustrates a high level block diagram of an IPTV set top box hardware of the present invention.

FIG. 2 illustrates a high level block diagram 200 of an IPTV set top box hardware of the present invention. In FIG. 2, set top box hardware includes microprocessor 201 for overall control, memory 202 to hold stored media contents such as movies and pictures, network and TV interface 203, channel display 204 and channel changing interface 205, Input/Output (I/O) interface 206 which is used to connected to various I/O and home networking components, power supply 207, and data modem 208. Network interface 203 provides an input terminal to receive input signal of video contents from a service provider and an output terminal to send video contents to a TV set. Data modem 208 is set to monitor the designated data downstream frequency band (commonly in 6 MHz channels between 45 MHz to 850 MHz) to collect incoming requests for content. Data modem 208 also delivers requested media content via the designated data upstream frequency band (commonly 5 MHz to 42 MHz for North America). I/O interface 206 provides I/O terminals that are used to connect to wired or wireless Local Area Network (LAN), VCR, DVD, DVR, digital camera, or camcorder. Channel display 204 comprises a Light Emitting Diode (LED) driver and a LEC display unit. Channel changing interface 205 comprises an infrared sensor unit, toggle switches, and an interface unit.

Figure 3:
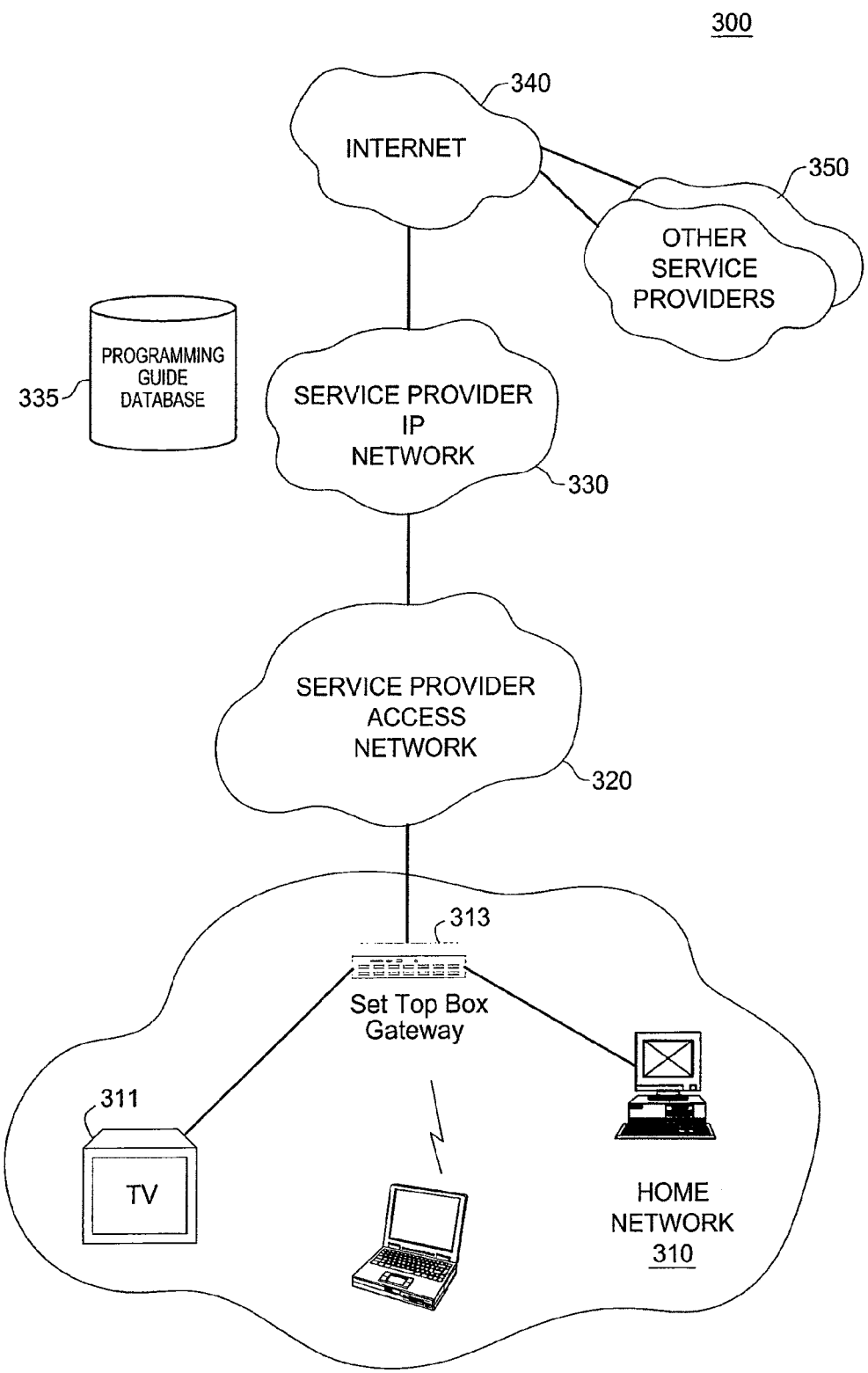
FIG. 3 illustrates an exemplary IPTV network related to the present invention.

FIG. 3 illustrates an exemplary IP network, e.g., an IPTV service network 300 related to the present invention. In FIG. 3, exemplary home network 310 comprises a set top box gateway 313, a TV 311, and other computing devices such as personal computers (PC), laptops, camcorders, and digital cameras, etc. The home network 310 can be a wired LAN such as an Ethernet network, a wireless LAN based on the Institute of Electrical and Electronic Engineer (IEEE) 802.11 standards, or a combination of both.

In one embodiment, set top box gateway 313 acts as the gateway to the home network and manages data exchange between home network 310 and service provider access network 320. In home network 310, TV 311 is connected to set top box gateway 313 to receive video contents. In another embodiment, set top box gateway 313 functions as a set top box and the gateway functionality is incorporated in a separate device, such as a dedicated gateway or home router to gain access to the service provider access network 320. In addition, various types of electronic devices such as DVD player, VCR player, DVR player, camcorder, and digital camera can be connected to set top box gateway 313 to support subscriber based media content feeds. It should be noted that the configuration of home network 310 as shown is only exemplary.

Service provider access network 320 is connected to service provider IP network 330. Service provider access network 320 provides access and IP connectivity between home network 310 and service provider IP network 330. In one embodiment, service provider access network 320 is a broadband access network such as a cable network, a Fiber to the Home (FTTH) network, or a Digital Subscriber Loop (DSL) network. Service provider access network connects to an IP network. Service provider access network 320 and service provider IP network 330 can be managed by the same provider or they can be managed by two independent service providers. Service provider IP network 330 provides various types of IP based services including, but not limited to, IPTV, voice and data services, to a subscriber in home network 310. Programming guide database 335 residing in service provider IP network 330 can be accessed by the subscriber to search for video content programming and scheduling information. Service provider IP network 330 may also be connected to Internet 340 to provide access to other IP based services provided by other service providers 350.

Figure 4:
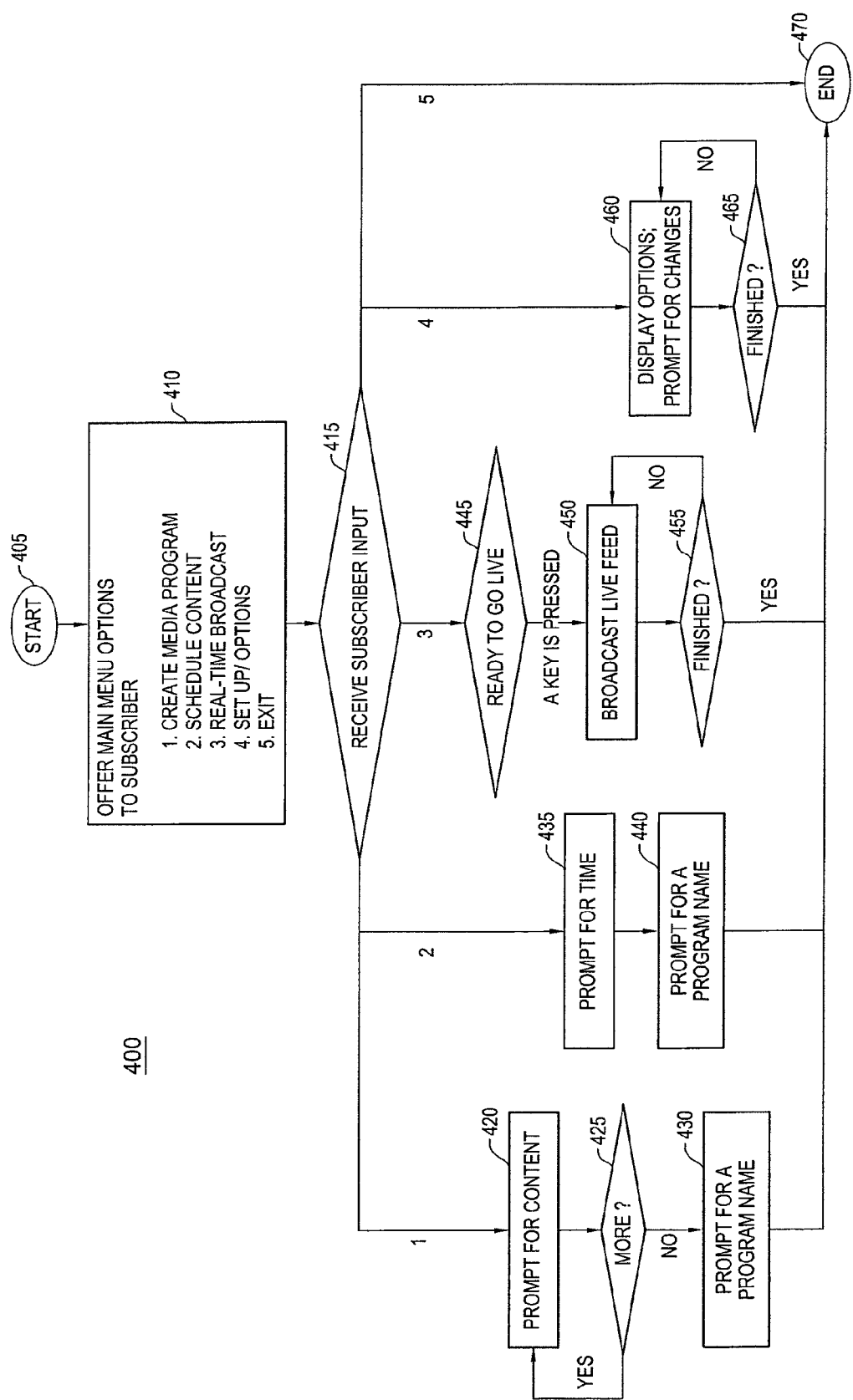
FIG. 4 illustrates a flowchart of a method for setting up and publishing shared media content in a packet network, e.g., an IPTV network, of the present invention.

FIG. 4 illustrates a flowchart of a method 400 for setting up and publishing shared media content in a packet network, e.g., an IPTV network, of the present invention. Method 400 starts in step 405 and proceeds to step 410.

In step 410, the method offers the main menu options to a subscriber. Exemplary main menu options that can be selected by the subscriber may include:
1. Create media program
2. Schedule content
3. Real-time broadcast
4. Setup and options
5. Exit.

Option 1 allows the subscriber to setup a sequential set of media content in a continuous sequence, such as movies in mpeg, avi, mov formats, pictures or images in jpeg, tif, gif formats, and/or music (e.g., an audio file) in way, mp3 formats into a media content programming that can be shared with other subscribers. Note that mpeg, avi, mov formats are widely supported industrial standard digital video formats. Note also that jpeg, tif, gif are widely supported industrial standard digital image formats.

Option 2 allows the subscriber to schedule selected media content for specific time and date. This option allows a user to set up their own broadcast programming for selected or all timeslots of the day.

Option 3 allows the subscriber to go live by using a camcorder, movie camera, or webcam to project a live broadcast feed. For example, the live broadcast feed is displayed on the television so that the broadcast can be monitored by the subscriber.

Option 4 allows the subscriber to perform various global functions, such as to publicize the established media program to the targeted audience, e.g., via email, post the media content programming on a public programming guide, select or change an off the air logo or picture, select optional password that can be used to password protect the media content programming to be broadcasted.

Returning to FIG. 4, in step 415, the method receives a selected option from the subscriber. If the selected option is 1, the method proceeds to step 420. If the selected option is 2, the method proceeds to step 435. If the selected option is 3, the method proceeds to step 445. If the selected option is 4, the method proceeds to step 460. If the selected option is 5, the method proceeds to step 470.

In step 420, the method displays a prompt requesting the user to enter the location of the media to add to the media content programming being created. An exemplary screen shot is shown in FIG. 5. The subscriber selects and enters the location of each desired media content piece. The media content can reside within computing or storage devices in a home network and the subscriber can step through a directory and file hierarchy to identify the media content location. Media contents that can be selected include, but are not limited to, movies, pictures, and/or music contents.

In step 425, the method checks if additional media content is to be added. An exemplary screen shot is shown in FIG. 6. If additional media content is to be added, the method proceeds back to step 420; otherwise, the method proceeds to step 430.

In step 430, the method prompts the subscriber for a program name to identify the newly created media content programming. An exemplary screen shot is shown in FIG. 7.

Figure 8:
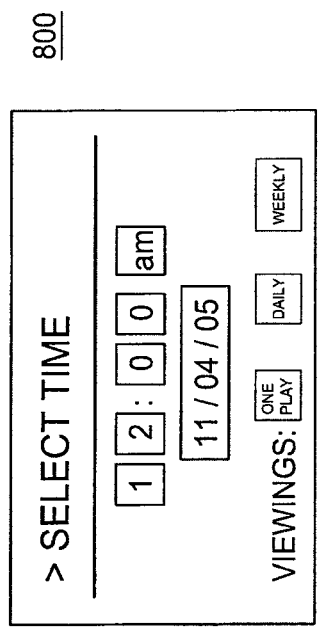
FIG. 8 illustrates an exemplary user interface screen for scheduling shared media content programming related to the present invention.

In step 435, the method displays a prompt requesting the subscriber to schedule a time for the created shared media content programming. An exemplary screen shot is shown in FIG. 8. In addition to time and date, a viewing prompt allows for a single play or a reoccurring play on a daily or weekly basis can be selected by the subscriber.

Figure 9:
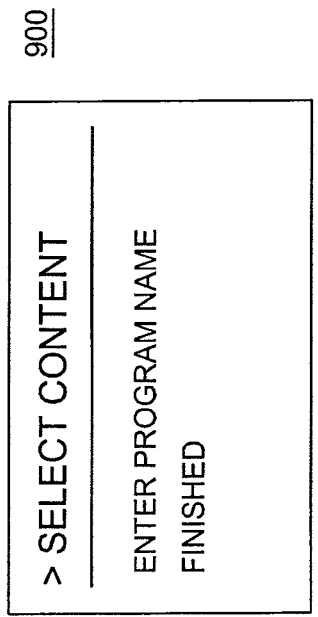
FIG. 9 illustrates an exemplary user interface screen for prompting a name for the shared media content programming related to the present invention.

In step 440, the method prompts the subscriber for the shared media content program name of the media program that is being scheduled. An exemplary screen shot is shown in FIG. 9. For example, the program name has already been defined previously in step 430.

Figure 10:
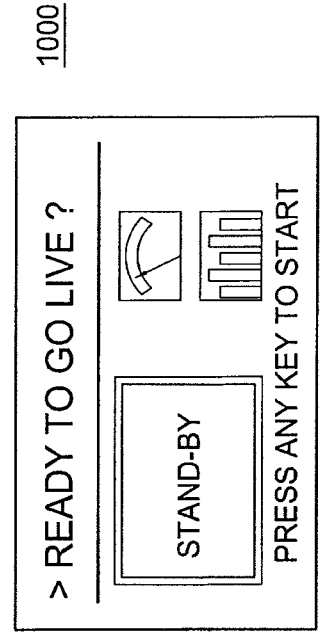
FIG. 10 illustrates an exemplary user interface screen for entering live mode to broadcast the selected shared media content programming related to the present invention.

In step 445, the method displays a prompt asking the subscriber to press any key to go into the live mode to broadcast real-time video contents captured by a video camera or a camcorder. An exemplary screen shot is shown in FIG. 10. The TV screen also displays a video monitor view of the digital camera and audio meters so the user can confirm the equipment is properly functioning before going live. Once a key, e.g., any key, is pressed by the subscriber, the method proceeds to step 450; otherwise, the method waits for the subscriber until a key is pressed.

In step 450, the method enters the live mode and the resulting video is available as a live feed and is broadcasted subject to media control as defined in the global settings.

In step 455, the method checks to see if the real-time broadcast is finished. This broadcast would typically be terminated by the user once the broadcast is completed. If the real-time broadcast is finished, the method proceeds to step 470; otherwise, the method proceeds back to step 450 and continues with the live broadcast and continues to poll for broadcast completion.

In step 460, the method displays a menu of various global options that may be configured by the subscriber. These options include, but are not limited to:
1. Publicize media programming to prospective viewers (e.g., via email);
2. Publicize media programming by posting the media contents/programming on a public programming guide. Postings would contain pertinent information such as the program title, the address where the program can be found, a description of the contents, the time, whether a password is required, etc;
3. Select or change an off the air logo or picture;
4. Set password(s) that can be used to password protect specific or all created media content programming;
5. Manage program names (e.g., rename or delete program names).

In step 465, the method checks if the setup and options selections have been finished by a subscriber. If the setup and options selections have been finished by the subscriber, the method proceeds to step 470; otherwise, the method proceeds back to step 460. Method 400 ends in step 470.

FIG. 5 illustrates an exemplary user interface screen 500 for selecting shared media content related to the present invention. In FIG. 5, the subscriber can use user interface screen 500 to select and enter the location of each desired media content piece. The media content can reside within computing or storage devices in a home network and the subscriber can step through a directory and file hierarchy to identify the media content location. Media contents that can be selected include, but are not limited to, movies, pictures, music contents. A subscriber uses the finished option to exit this screen.

FIG. 6 illustrates an exemplary user interface screen 600 for adding shared media content related to the present invention. In FIG. 6, the subscriber can use user interface screen 600 to add additional shared media contents to the shared media program being created. A subscriber uses the finished option to exit this screen.

FIG. 7 illustrates an exemplary user interface screen 700 for entering a name for the shared media content programming related to the present invention. In FIG. 7, the subscriber can use user interface screen 700 to enter a name to identify the shared media program being created.

FIG. 8 illustrates an exemplary user interface screen 800 for scheduling shared media content programming related to the present invention. In FIG. 8, the subscriber can use user interface screen 800 to schedule a time for the created media content programming. The subscriber can specify the time, the date, and/or a viewing option that allows for a single play or a reoccurring play on a daily or weekly basis.

FIG. 9 illustrates an exemplary user interface screen for prompting a name for the shared media content programming related to the present invention. In FIG. 9, the subscriber can use user interface screen 900 to enter the name of a shared media content programming that will be scheduled according to the configured scheduled time performed in step 435 via user interface screen 800. A subscriber uses the finished option to exit this screen.

FIG. 10 illustrates an exemplary user interface screen for entering live mode to broadcast the selected shared media content programming related to the present invention. In FIG. 10, the subscriber can use user interface screen 1000 to enter the live mode to broadcast real-time video contents captured by a video camera or a camcorder.

Figure 11:
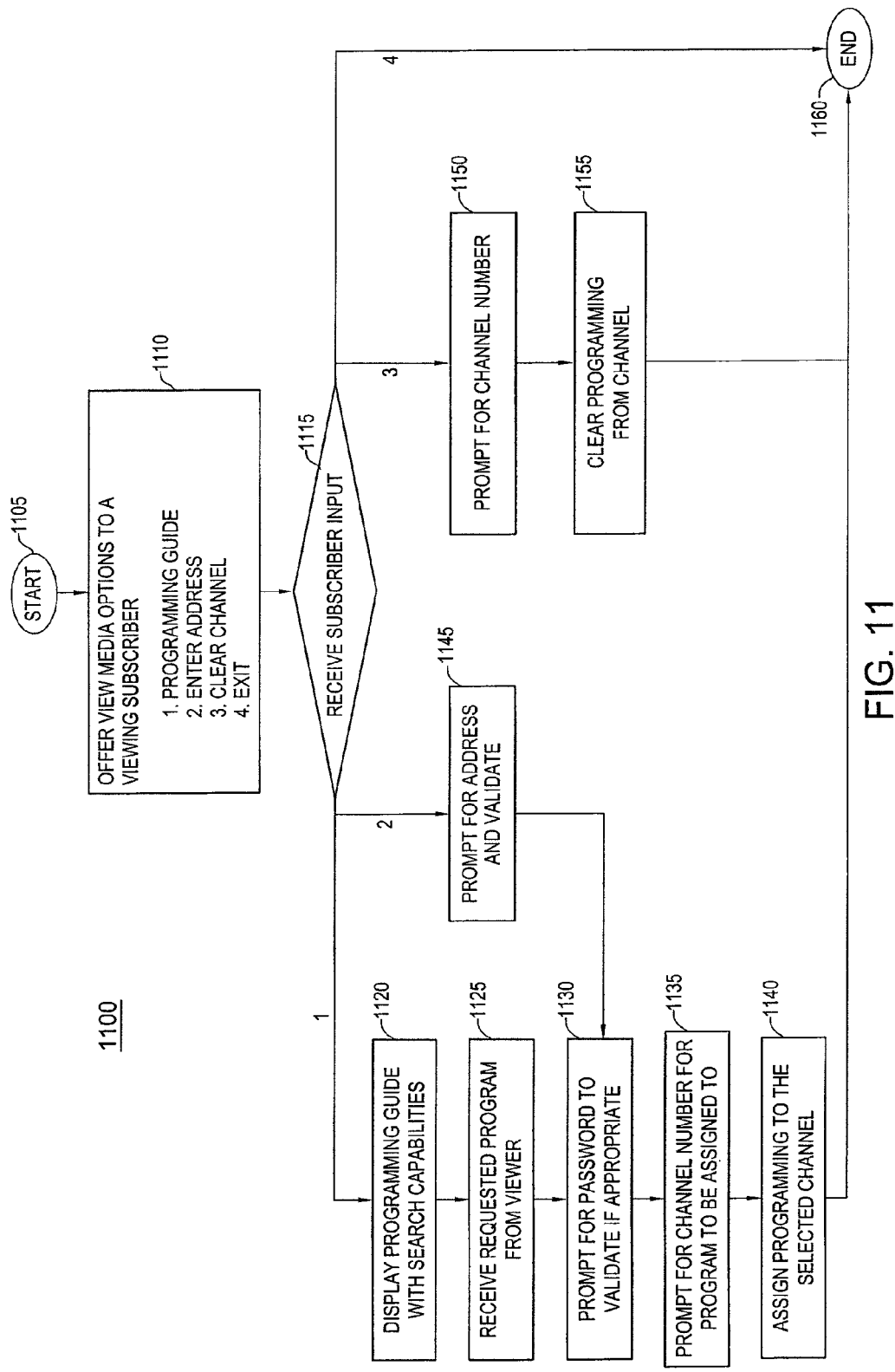
FIG. 11 illustrates a flowchart of a method for viewing shared media content programming in a packet network, e.g., an IPTV network, of the present invention.

FIG. 11 illustrates a flowchart of a method 1100 for assigning a television channel to shared media content programming in a packet network, e.g., an IPTV network, of the present invention. The method allows a viewing subscriber to select and view a shared media program created by another subscriber. The method can be executed via dedicated software within the set top box or from a web site over the Internet. Method 1100 starts in step 1105 and proceeds to step 1110.

In step 1110, the method offers view media menu options to a viewing subscriber. Exemplary view media menu options may include:
1. Programming guide;
2. Enter address;
3. Clear Channel;
4. Exit.

In step 1115, the method receives a selected option from the subscriber. If the selected option is 1, the method proceeds to step 1120. If the selected option is 2, the method proceeds to step 1145. If the selected option is 3, the method proceeds to step 1150. If the selected option is 4, the method proceeds to step 1160.

In step 1120, the method allows the viewing subscriber to search an interactive programming guide and select the desired shared media programming to view. The interactive guide shows the contents of each program as the viewing subscriber searches through the programming. The method allows a viewing subscriber to watch part of or all of a program before deciding which shared media content program to view.

In step 1125; the method receives the selected shared media program to be viewed from the viewing subscriber.

In step 1130, if the selected program requires a password, the method prompts the viewing subscriber to enter a password to be validated. In one embodiment, the password validation occurs by matching the entered password and the stored password in the programming guide. In another embodiment, the password validation occurs by verifying the entered password with the password stored in the set top box at the targeted address.

In step 1135, the method prompts the viewing subscriber for an unassigned channel to assign the shared media content programming to be viewed from. For example, the viewing subscriber can use any unassigned television channel number to assign the selected shared media content programming. Multiple channels can be assigned to different shared media content programs. This assignment creates a very simple viewing interface—the viewer simply changes television channels to the assigned channel to view the content. This channel-to-programming relationship will remain unless it is later cleared by the viewer as described in step 1155 below.

In step 1140, the method assigns the selected shared media content programming to the unassigned channel selected by the viewing subscriber.

In step 1145, the method prompts the viewing subscriber to directly enter the address of the desired programming. In one embodiment, the address is simply an IP address. In another embodiment, the address is represented by a text string assigned by the service providers that is similar to an email address. The method then proceeds to step 1130.

In step 1150, the method prompts the viewing subscriber to enter a previously assigned channel number that is to be cleared and returned to the unassigned channel pool.

In step 1155, the method clears the entered TV channel. This allows viewing subscribers to release programming that they are no longer interested in viewing. Method 1100 ends in step 1160.

Figure 12:
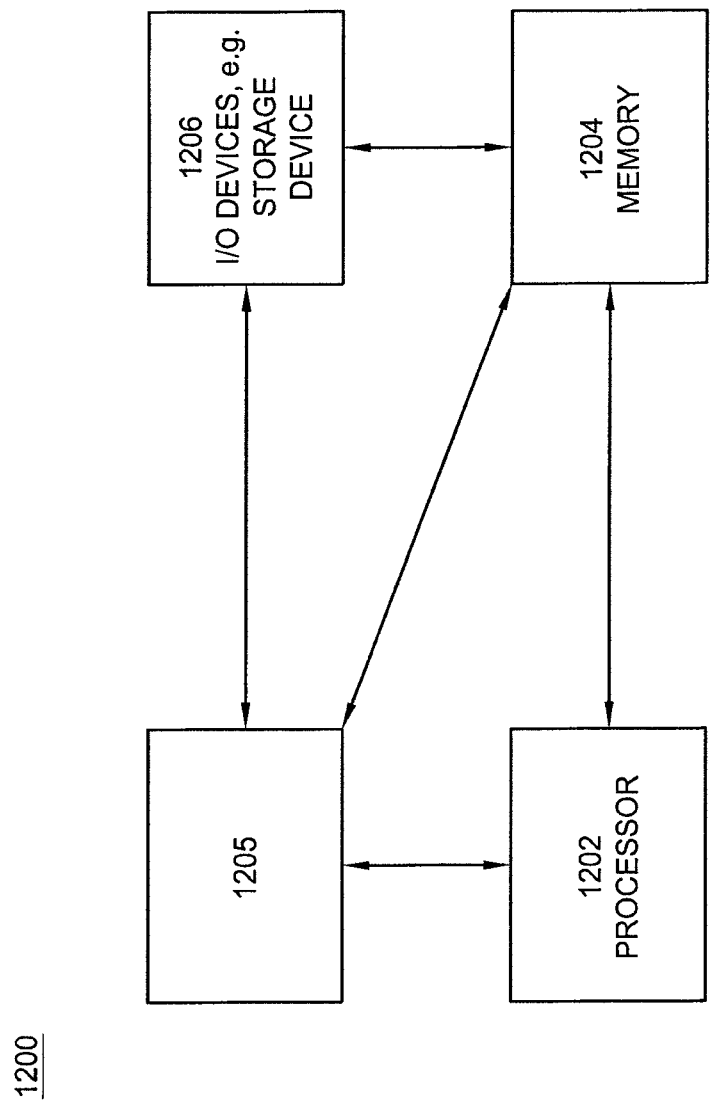
FIG. 12 illustrates a high level block diagram of a general purpose computer suitable for use in performing the functions described herein.

FIG. 12 depicts a high level block diagram of a general purpose computer suitable for use in performing the functions described herein. As depicted in FIG. 12, the system 1200 comprises a processor element 1202 (e.g., a CPU), a memory 1204, e.g., random access memory (RAM) and/or read only memory (ROM), a module 1205 for media content sharing, and various input/output devices 1206 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 1205 for media content sharing can be loaded into memory 1204 and executed by processor 1202 to implement the functions as discussed above. As such, the present process 1205 for media content sharing (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for accessing media content from a communication network, comprising:

selecting, via a processor, a media content programming created by a first subscriber of the communication network, wherein the selecting of the media content programming is performed in response to a first input by a second subscriber of the communication network;

selecting, via the processor, a channel number for receiving the media content programming, wherein the selecting of the channel number is performed in response to a second input by the second subscriber, wherein the channel number corresponds to an unused channel that is available to be assigned to carry a program signal comprising media content, wherein the unused channel comprises an unassigned channel that is currently not carrying any media content programming, wherein the unassigned channel is associated with a downstream frequency band; and receiving, via the processor, the media content programming from the communication network via the unused channel, wherein the media content programming is delivered on the unused channel by the communication network in response to the channel number that is selected.

2. The method of claim 1, wherein the communication network comprises an internet protocol network.

3. The method of claim 1, wherein the media content programming comprises live media content that is captured by a video camera.

4. The method of claim 3, wherein the media content programming comprises a sequence of the live media content.

5. The method of claim 3, wherein the media content programming is scheduled by the first subscriber in accordance with a time.

6. The method of claim 1, wherein the receiving of the media content programming requires a password if the password is configured by the first subscriber.

7. The method of claim 1, wherein the media content programming is publicized by the first subscriber via a shared media content programming guide residing in the communication network.

8. The method of claim 1, wherein the media content programming is received from the communication network via a set top box comprising the processor.

9. The method of claim 1, wherein a source of the media content programming is determined by the second subscriber and an address associated with the media content programming is provided to the communication network.

10. The method of claim 9, wherein the address comprises an email address.

11. A non-transitory computer-readable medium storing instructions which, when executed by a processor, cause the processor to perform operations for accessing media from a communication network, the operations comprising:

selecting a media content programming created by a first subscriber of the communication network, wherein the selecting of the media content programming is performed in response to a first input by a second subscriber of the communication network;

selecting a channel number for receiving the media content programming, wherein the selecting of the channel number is performed in response to a second input by the second subscriber, wherein the channel number corresponds to an unused channel that is available to be assigned to carry a program signal comprising media content, wherein the unused channel comprises an unassigned channel that is currently not carrying any media content programming, wherein the unassigned channel is associated with a downstream frequency band; and receiving the media content programming from the communication network via the unused channel, wherein the media content programming is delivered on the unused channel by the communication network in response to the channel number that is selected.

12. The non-transitory computer-readable medium of claim 11, wherein the communication network comprises an internet protocol network.

13. The non-transitory computer-readable medium of claim 11, wherein the media content programming comprises:
live media content that is captured by a video camera.

14. The non-transitory computer-readable medium of claim 13, wherein the media content programming comprises a sequence of the live media content.

15. The non-transitory computer-readable medium of claim 13, wherein the media content programming is scheduled by the first subscriber in accordance with a time.

16. The non-transitory computer-readable medium of claim 11, wherein the receiving of the media content programming requires a password if the password is configured by the first subscriber.

17. The non-transitory computer-readable medium of claim 11, wherein the media content programming is publicized by the first subscriber via a shared media content programming guide residing in the communication network.

18. The non-transitory computer-readable medium of claim 11, wherein the media content programming is received from the communication network via a set top box comprising the processor.

19. The non-transitory computer-readable medium of claim 11, wherein a source of the media content programming is determined by the second subscriber and an address associated with the media content programming is provided to the communication network.

20. An apparatus for accessing media content from a communication network, comprising:
a processor; and
a computer-readable medium storing instructions which, when executed by the processor, cause the processor to perform operations comprising:
selecting a media content programming created by a first subscriber of the communication network, wherein the selecting of the media content programming is performed in response to a first input by a second subscriber of the communication network;
selecting a channel number for receiving the media content programming, wherein the selecting of the channel number is performed in response to a second input by the second subscriber, wherein the channel number corresponds to an unused channel that is available to be assigned to carry a program signal comprising media content, wherein the unused channel comprises an unassigned channel that is currently not carrying any media content programming, wherein the unassigned channel is associated with a downstream frequency band; and
receiving the media content programming from the communication network via the unused channel, wherein the media content programming is delivered on the unused channel by the communication network in response to the channel number that is selected.

* * * * *